US012597428B2

(12) United States Patent
Noguchi

(10) Patent No.: US 12,597,428 B2
(45) Date of Patent: Apr. 7, 2026

(54) DISPLAY DEVICE, CONTROL METHOD OF DISPLAY DEVICE, AND RECORDING MEDIUM

(71) Applicant: HONDA MOTOR CO., LTD., Tokyo (JP)

(72) Inventor: Takashi Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 18/582,462

(22) Filed: Feb. 20, 2024

(65) Prior Publication Data

US 2024/0331701 A1 Oct. 3, 2024

(30) Foreign Application Priority Data

Mar. 28, 2023 (JP) ................................. 2023-051555

(51) Int. Cl.
*G10L 15/26* (2006.01)
*B60K 37/20* (2024.01)

(52) U.S. Cl.
CPC .............. *G10L 15/26* (2013.01); *B60K 37/20* (2024.01); *B60K 2360/1434* (2024.01); *B60K 2360/148* (2024.01); *B60K 2360/1523* (2024.01); *B60K 2360/163* (2024.01); *B60K 2360/175* (2024.01); *B60K 2360/21* (2024.01); *B60Y 2400/303* (2013.01); *B60Y 2400/92* (2013.01)

(58) Field of Classification Search
None
See application file for complete search history.

(56) References Cited

U.S. PATENT DOCUMENTS

| | | | | |
|---|---|---|---|---|
| 5,499,182 A | * | 3/1996 | Ousborne | G06F 11/34 701/33.9 |
| 11,854,318 B1 | * | 12/2023 | Gregory | G06F 3/0481 |
| 2004/0130442 A1 | * | 7/2004 | Breed | G06V 20/593 340/449 |
| 2011/0093158 A1 | * | 4/2011 | Theisen | G06F 9/453 701/29.5 |
| 2015/0172450 A1 | * | 6/2015 | Singhal | H04M 1/72463 455/419 |
| 2018/0121071 A1 | * | 5/2018 | Khafagy | G06F 3/04847 |
| 2020/0211553 A1 | * | 7/2020 | Bohl | G10L 15/26 |
| 2022/0058400 A1 | * | 2/2022 | Bianconcini | G06T 7/70 |
| 2022/0201083 A1 | * | 6/2022 | Kathpal | H04W 4/44 |
| 2022/0392342 A1 | * | 12/2022 | Fields | G08G 1/164 |

(Continued)

FOREIGN PATENT DOCUMENTS

JP 2022-129626 A 9/2022

*Primary Examiner* — Neeraj Sharma
(74) *Attorney, Agent, or Firm* — Rankin, Hill & Clark LLP

(57) ABSTRACT

Provided is a display device to be provided in a vehicle, the display device including: a state acquisition unit configured to acquire a state of the vehicle; a conversion unit configured to convert a voice spoken in an online conference, in which an occupant of the vehicle participates, into text; and a display controller configured to display the text converted by the conversion unit on a display unit, wherein the display controller being configured to make display modes of the text converted by the conversion unit different from each other depending on the state of the vehicle acquired by the state acquisition unit.

6 Claims, 7 Drawing Sheets

(56)      References Cited

U.S. PATENT DOCUMENTS

| 2023/0146013 A1* | 5/2023 | Bethge | B60W 40/105 |
| | | | 701/36 |
| 2023/0258466 A1* | 8/2023 | Lee | B60K 35/28 |
| | | | 701/426 |
| 2024/0205174 A1* | 6/2024 | Bailey | G06F 40/30 |

* cited by examiner

FIG.6

GOOD MORNING/TODAY/IT IS HOT

TX          TX          TX

TA

DISPLAY DEVICE, CONTROL METHOD OF DISPLAY DEVICE, AND RECORDING MEDIUM

INCORPORATION BY REFERENCE

The present application claims priority under 35 U.S.C. § 119 to Japanese Patent Application No. 2023-051555 filed on Mar. 28, 2023. The content of the application is incorporated herein by reference in its entirety.

BACKGROUND OF THE INVENTION

Field of the Invention

The present invention relates to a display device, a control method of the display device, and a recording medium.

Description of the Related Art

In recent years, active efforts have been made to provide access to a sustainable transportation system while taking into consideration even vulnerable people such as the elderly, people with disabilities, and children among traffic participants. To realize this, the focus is on research and development for further improving safety and convenience through development regarding comfortability of a vehicle. A technique for conducting an online conference in a vehicle has been known as a technique related to comfortability of the vehicle (for example, see Japanese Patent Laid-Open No. 2022-129626). Japanese Patent Laid-Open No. 2022-129626 discloses an in-vehicle terminal device that is installed in a vehicle and constitutes an electronic conference system. The in-vehicle terminal device switches output or non-output of the other party's voice from a speaker in the vehicle, and switches transmission or non-transmission of a voice signal in the vehicle to the other party's terminal device, depending on a state of the vehicle.

By the way, when an online conference is held in which occupants of a vehicle participate, it is assumed that a display device of the vehicle displays a voice spoken in the online conference with text. However, when the voice spoken in the online conference is displayed with the text, there is a risk that a driver may be distracted by the displayed text, and thus it is required to display text in consideration of a state of the vehicle.

The present invention has been made in view of the above-described circumstance, and an object thereof is to display text in consideration of the state of the vehicle when the voice spoken in the online conference in which the occupant of the vehicle participates is displayed with the text.

SUMMARY OF THE INVENTION

One aspect of the present invention provides a display device to be provided in a vehicle, the display device including: a state acquisition unit configured to acquire a state of the vehicle; a conversion unit configured to convert a voice spoken in an online conference, in which an occupant of the vehicle participates, into text; and a display controller configured to display the text converted by the conversion unit on a display unit, wherein the display controller being configured to make display modes of the text converted by the conversion unit different from each other depending on the state of the vehicle acquired by the state acquisition unit.

Advantageous Effect of Invention

According to the aspect of the present invention, it is possible to display the text in consideration of the state of the vehicle when the voice spoken in the online conference in which the occupant of the vehicle participates is displayed with the text.

BRIEF DESCRIPTION OF THE DRAWINGS

FIG. 6 is a diagram explaining a second display mode; and

DETAILED DESCRIPTION OF THE PREFERRED EMBODIMENTS

1. Configuration of Conference System

Figure 1:
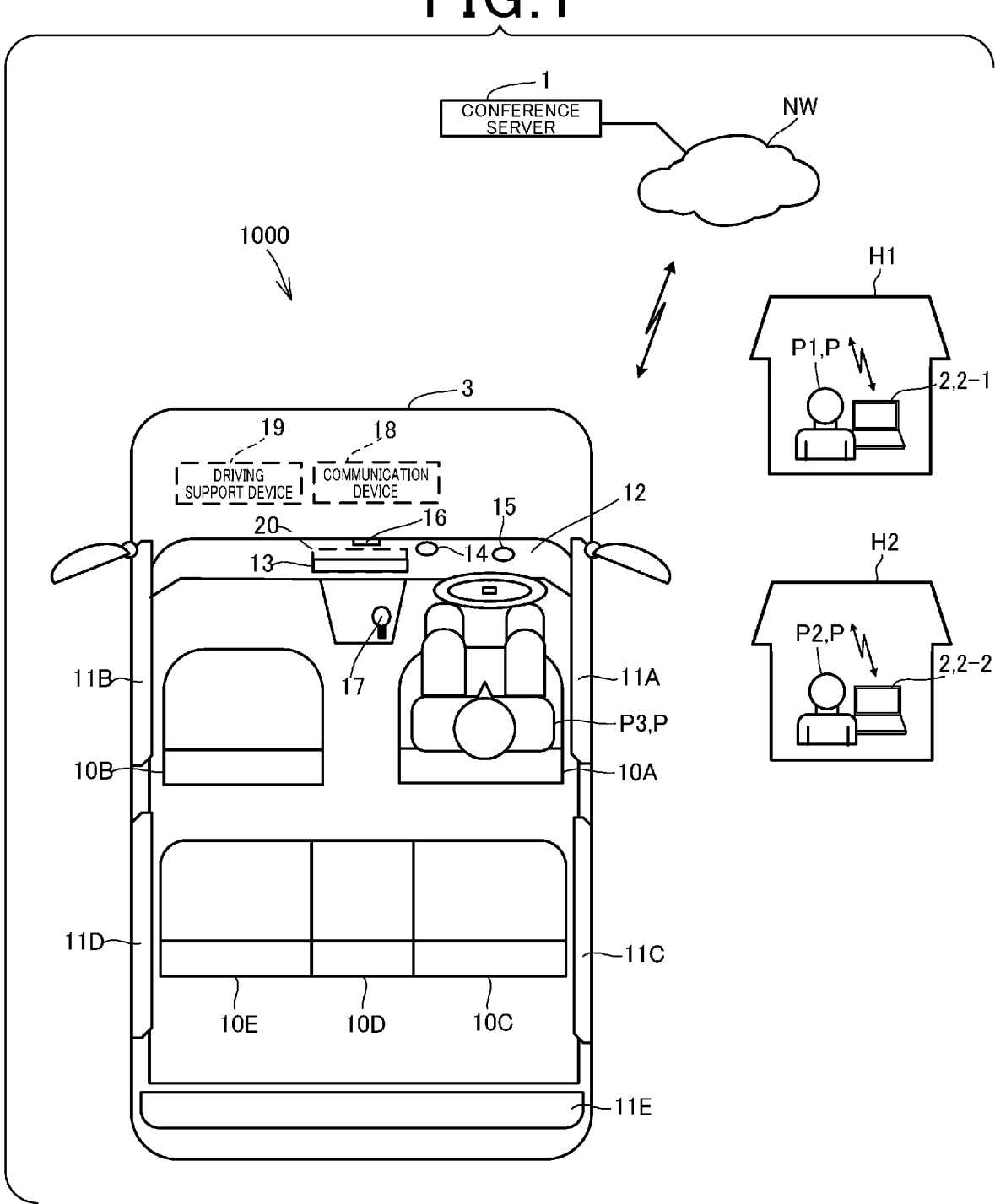
FIG. 1 is a diagram showing a configuration of a conference system.

FIG. 1 is a diagram showing a configuration of a conference system 1000.

The conference system 1000 includes a conference server 1, one or a plurality of terminal devices 2, and one or a plurality of vehicles 3. FIG. 1 illustrates a case where the conference system 1000 includes two terminal devices 2 and one vehicle 3. FIG. 1 shows a case where three conference participants P of a terminal user P1, a terminal user P2, and an occupant P3 of the vehicle 3 have an online conference.

The terminal user P1 is participating in an online conference using a terminal device 2-1 at a facility H1. The terminal user P2 is participating in an online conference using a terminal device 2-2 at a facility H2. The occupant P3 is participating in an online conference using a display device 20 in the vehicle 3.

The conference server 1 is a server device that provides an online conference. This online conference is a conference in which the occupant P3 can participate in the vehicle 3. The conference server 1 connects to a network NW, and communicates with the terminal device 2 and the vehicle 3. The network NW is a communication network configured by a public line network, a private line, and other communication circuits.

The terminal device 2 is, for example, a smartphone, a tablet PC (Personal Computer), a laptop PC, a desktop PC, and the like. FIG. 1 illustrates a case where the terminal device 2 is a laptop PC. The terminal device 2 connects to the network NW and communicates with the conference server 1.

An application program is installed into the terminal device 2 to participate in an online conference provided by the conference server 1. During the online conference, the terminal device 2 uses a function of the application program to transmit voice data spoken by the conference participant P to the conference server 1. Upon receiving the voice data from the terminal device 2, the conference server 1 transmits the received voice data to another terminal device 2 used by the conference participant P who is participating in the same online conference as the conference participant P who spoke. Further, upon receiving the voice data from the terminal device 2, the conference server 1 transmits the received voice data to the vehicle 3 on which the occupant P3, who is participating in the same online conference as the conference participant P who spoke, rides. For example, upon receiving voice data from the terminal device 2-1, the conference server 1 transmits the received voice data to the terminal device 2-2 and the vehicle 3. Further, for example, upon receiving voice data from the terminal device 2-2, the conference server 1 transmits the received voice data to the terminal device 2-1 and the vehicle 3.

The terminal device 2 may transmit data of a moving image captured by a camera that is provided or connected thereto, like the voice data. Upon receiving data of the moving image from the terminal device 2, the conference server 1 transmits the received data of the moving image to another terminal device 2 and the vehicle 3, like the voice data.

2. Configuration of Vehicle

The vehicle 3 illustrated in FIG. 1 is a four-wheel vehicle with a riding capacity of five people. The vehicle 3 includes a driver seat 10A, a passenger seat 10B, a right rear seat 10C, a center rear seat 10D, and a left rear seat 10E. The occupant P3 of the vehicle 3 shown in FIG. 1 is a driver. In the vehicle 3 shown in FIG. 1, the occupant P3 is seated in the driver seat 10A. The vehicle 3 is not limited to a four-wheel vehicle, and may have three or less wheels or five or more wheels. In addition, the riding capacity of the vehicle 3 may be four or less, or six or more.

The vehicle 3 includes a right front door 11A, a left front door 11B, a right rear door 11C, a left rear door 11D, and a tailgate 11E. By opening of the right front door 11A, the left front door 11B, the right rear door 11C, and the left rear door 11D, passengers can enter or exit an interior space of the vehicle 3. The tailgate 11E opens or closes a trunk of the vehicle 3.

The vehicle 3 includes a dashboard 12. The dashboard 12 is installed with a touch panel 13, a speaker 14, and a microphone 15. The touch panel 13 is configured in such a manner that a display panel and a touch sensor are overlapped or integrated, the display panel being configured to display characters and images, a touch sensor being configured to detect contact with the display panel. The speaker 14 outputs a voice to the interior space of the vehicle 3. The microphone 15 collects voices inside the vehicle 3. The installation positions and numbers of the speaker 14 and the microphone 15 can be changed as desired.

The touch panel 13 is an example of a "display unit".

A camera 16 is installed inside the interior of the vehicle 3 to capture the interior of the vehicle 3. The camera 16 is a so-called driver monitoring camera (DMC), and captures a driver seated in the driver seat 10A. A capturing range of the camera 16 is set to a range including at least the driver's head.

In the interior of the vehicle 3, a shift lever 17 is installed near the driver seat 10A.

The vehicle 3 includes a communication device 18 (transmitter/receiver, circuit) that can communicate with the conference server 1. The communication device 18 is a so-called TCU (Telematics Control Unit), and communicates with the conference server 1.

The vehicle 3 includes a driving support device 19 (computer). The driving support device 19 is a device that executes a driving support function to support driving of the vehicle 3 by the driver. Examples of the driving support function executed by the driving support device 19 may include one or a plurality of functions of a collision damage reducing function, a lane departure preventing (lane keep assist) function, a straight driving support function, a rear side vehicle approach warning (blind spot monitor) function, and the like. The collision damage reducing function is a function of decelerating the vehicle 3 in order to avoid the collision or reduce of the collision damage when there is a possibility of collision with an object ahead in a direction of driving. In order to realize the above functions, the driving support device 19 is connected with a front camera that captures the front of the vehicle 3, a rear camera that captures the rear of the vehicle 3, and a radar unit that detects objects around the vehicle 3.

The vehicle 3 includes a display device 20. The display device 20 includes a touch panel 13, and is configured as a device called display audio (DA) or a car navigation device, for example.

Figure 2:
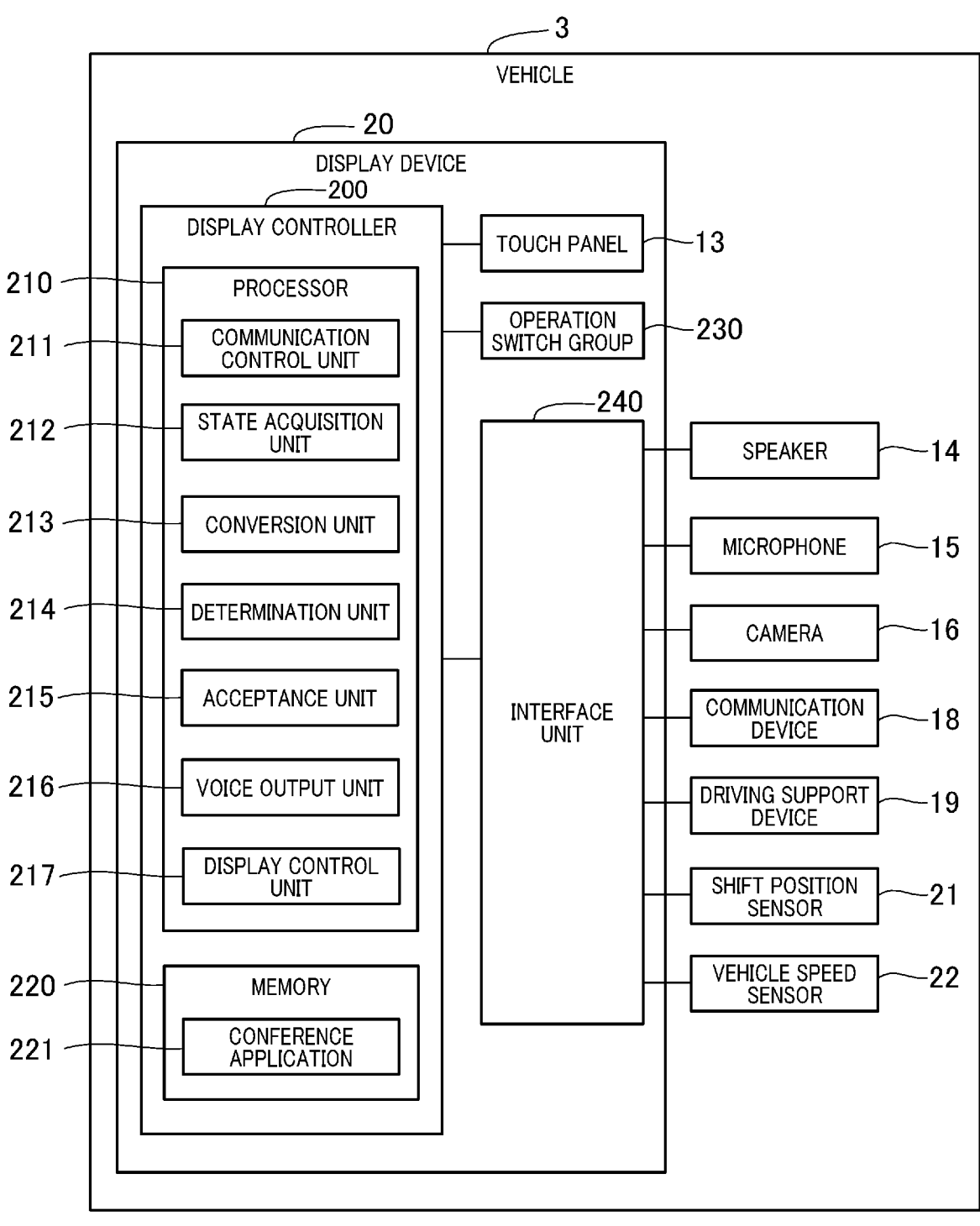
FIG. 2 is a diagram showing a configuration of a vehicle.

FIG. 2 is a diagram showing the configuration of the vehicle 3.

The vehicle 3 includes a display device 20, a speaker 14, a microphone 15, a camera 16, a communication device 18, a driving support device 19, a shift position sensor 21, and a vehicle speed sensor 22. The display device 20 is connected with the speaker 14, the microphone 15, the camera 16, the communication device 18, the driving support device 19, the shift position sensor 21, and the vehicle speed sensor 22. The devices connected to the display device 20 are not limited to these devices, and other devices may be connected.

The speaker 14 outputs various voices according to control of the display device 20.

The microphone 15 collects voices according to control of the display device 20.

The camera 16 outputs image data of the captured image to the display device 20.

The communication device 18 communicates with the conference server 1 according to control of the display device 20.

When the execution of the driving support function of the vehicle 3 is turned on, the driving support device 19 outputs information indicating that the execution of the driving support function of the vehicle 3 is turned on to the display device 20. Further, when the execution of the driving support function of the vehicle 3 is not turned on, the driving support device 19 outputs information indicating that the execution of the driving support function of the vehicle 3 is not turned on to the display device 20.

The shift position sensor 21 detects shift positions of the shift lever 17 provided in the vehicle 3. The shift positions include, for example, P (parking) used during parking or stopping, R (reverse) used during reversing, N (neutral), and D (drive) used during driving. The shift position sensor 21 outputs a detection signal indicating the detected shift position to the display device 20.

The vehicle speed sensor 22 detects a speed of the vehicle 3. The vehicle speed sensor 22 detects a speed of the vehicle 3 at a predetermined period, and outputs a detection signal indicating the speed of the vehicle 3 detected every detection to the display device 20.

The display device 20 is a device to be provided in the vehicle 3, and includes a display controller 200, a touch panel 13, an operation switch group 230, and an interface unit 240.

The display controller 200 incudes a processor 210 such as a CPU (Central Processing Unit) or an MPU (Micro Processor Unit), a memory 220, and an interface circuit configured to connect other devices and sensors, and controls each of the units of the display device 20.

The memory 220 is a storage device that stores programs and data. The memory 220 stores data processed by a conference application 221 and the processor 210. The memory 220 has a nonvolatile storage region. Further, the memory 220 may have a volatile region and constitutes a work area of the processor 210. The memory 220 is configured by a ROM (Read Only Memory) or a RAM (Random Access Memory), for example.

The conference application 221 is an example of a "program".

The conference application 221 is an application program for using an online conference provided by the conference server 1.

The touch panel 13 displays various kinds of information according to control of the display controller 200. The touch panel 13 outputs a detection signal of a touch sensor to the display controller 200.

The operation switch group 230 includes various operation switches for operating the display device 20. Each of the operation switches in the operation switch group 230 outputs an operation signal to the display controller 200 when being operated.

The interface unit 240 includes hardware such as a connector and a communication circuit, and communicates with various devices that are communicatively connected to the display device 20. In the present embodiment, the interface unit 240 is communicatively connected to the speaker 14, the microphone 15, the camera 16, the communication device 18, the shift position sensor 21, and the vehicle speed sensor 22.

The processor 210 reads and executes the conference application 221 stored in the memory 220, and thus functions as a communication control unit 211, a state acquisition unit 212, a conversion unit 213, a determination unit 214, an acceptance unit 215, a voice output unit 216, and a display controller 217.

The communication control unit 211 communicates with the conference server 1 via the communication device 18.

The communication control unit 211 receives voice data from the terminal device 2 via the conference server 1. When the terminal device 2 transmits data of a moving image, the communication control unit 211 receives the data of the moving image from the terminal device 2 via the conference server 1.

Further, the communication control unit 211 transmits the voice data of the sound, which is collected by the microphone 15, to the conference server 1. Upon receiving the voice data from the vehicle 3, the conference server 1 transmits the voice data to the terminal device 2 used by the conference participant P who participates in the online conference in which the occupant P3 of the vehicle 3 participates.

The communication control unit 211 may transmit data of a moving image captured by the camera 16, like the voice data. Upon receiving the data of the moving image from the vehicle 3, the conference server 1 transmits the received data of the moving image to the terminal device 2, like the voice data.

The state acquisition unit 212 acquires a state of the vehicle 3. The state acquisition unit 212 acquires a speed of the vehicle 3 as a state of the vehicle 3. The state acquisition unit 212 acquires the speed of the vehicle 3 by receiving the detection signal from the vehicle speed sensor 22.

The conversion unit 213 converts the voice indicated by the voice data received by the communication control unit 211 and the voice collected by the microphone 15 into text TX. The conversion unit 213 converts the voice indicated by the voice data received by the communication control unit 211 and the voice collected by the microphone 15 into text TX by voice recognition. The conversion unit 213 converts a voice into text TX in predetermined units. Examples of the predetermined unit may include each character, each word, and each clause. In the present embodiment, the conversion unit 213 converts a voice into text TX for each clause. For example, when the voice is "Today it is hot", the conversion unit 213 converts the voice "Today" into text TX, and then converts the voice "It is hot" into text TX. The conversion unit 213 outputs text information indicating converted text TX to the display controller 217 whenever performing conversion.

The determination unit 214 determines whether the execution of the driving support function of the vehicle 3 is turned on or off. When the display device 20 receives, from the driving support device 19, information indicating that the execution of the driving support function is turned on, the determination unit 214 determines that the execution of the driving support function of the vehicle 3 is turned on. On the other hand, when the display device 20 receives, from the driving support device 19, information indicating that the execution of the driving support function is turned off, the determination unit 214 determines that the execution of the driving support function of the vehicle 3 is turned off.

The acceptance unit 215 accepts operations on the display device 20 via the touch panel 13 and the operation switch group 230. When the determination unit 214 determines that the driving support function of the vehicle 3 is enabled, the acceptance unit 215 of the present embodiment accepts a selection operation for setting the display mode of the text displayed by the display controller 217 to a first display mode or a second display mode.

The voice output unit 216 outputs the voice indicated by the voice data received by the communication control unit 211 through the speaker 14.

The display controller 217 allows the touch panel 13 to display a conference screen KG.

Figure 3:
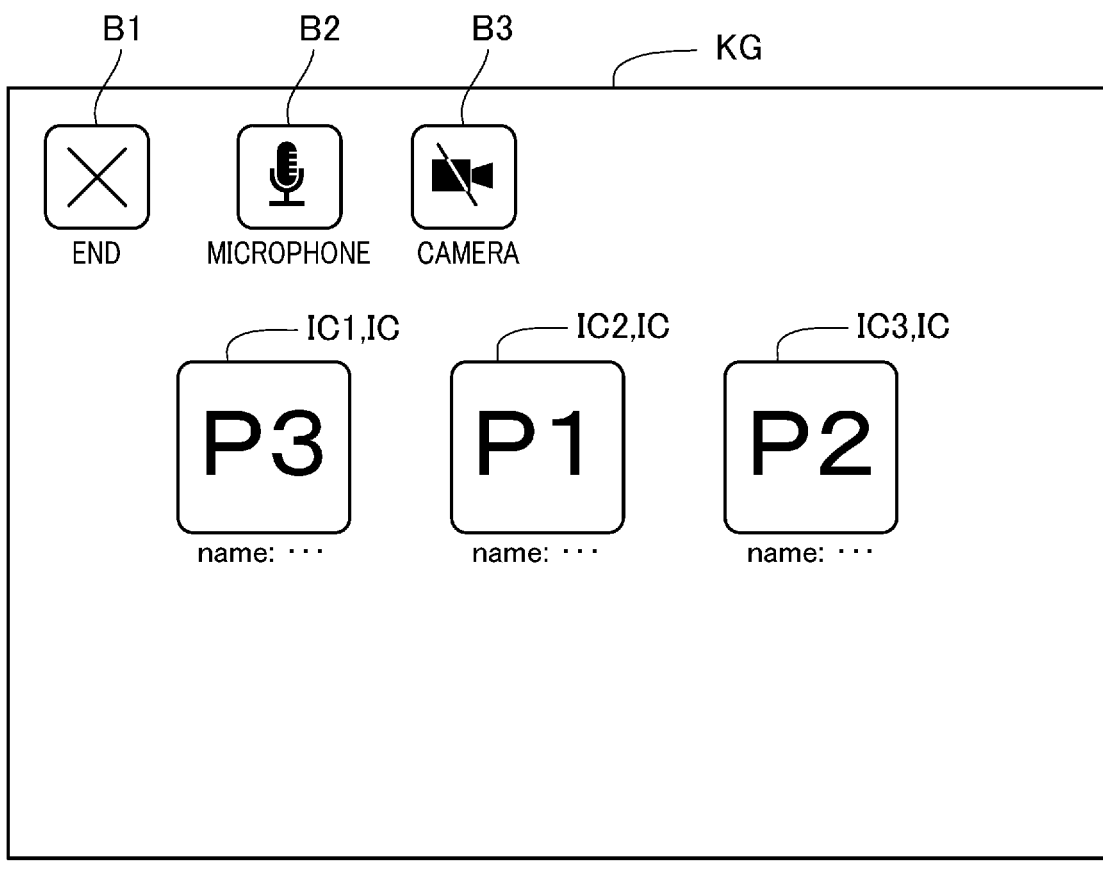
FIG. 3 is a diagram showing an example of a conference screen.

FIG. 3 is a diagram showing an example of a conference screen KG. The conference screen KG shown in FIG. 3 is a screen during an online conference.

The conference screen KG displays icons ICs indicating conference participants P, who participate in the online conference, for each conference participant P. The conference screen KG shown in FIG. 3 displays an icon IC1 for an occupant P3, an icon IC2 for a terminal user P1, and an icon IC3 for a terminal user P2.

In addition, the conference screen KG displays a conference end button B1, a microphone button B2, and a camera button B3.

The conference end button B1 is a software button for requesting the end of the online conference (exit from the online conference).

The microphone button B2 is a software button for instructing the microphone 15 to switch between on (unmute) and off (mute).

The camera button B3 is a software button for instructing the camera 16 to switch between on and off.

The arrangement mode of the icons ICs, shapes of the icons ICs, sizes of the icons ICs, the number of software buttons, and the kind of software buttons on the conference screen KG are not limited to the conference screen KG shown in FIG. 3.

The display controller 217 displays the text TX converted by the conversion unit 213 on the conference screen KG.

More specifically, the display controller 217 displays the text TX indicated by the text information received from the conversion unit 213 within the conference screen KG.

Figure 4:
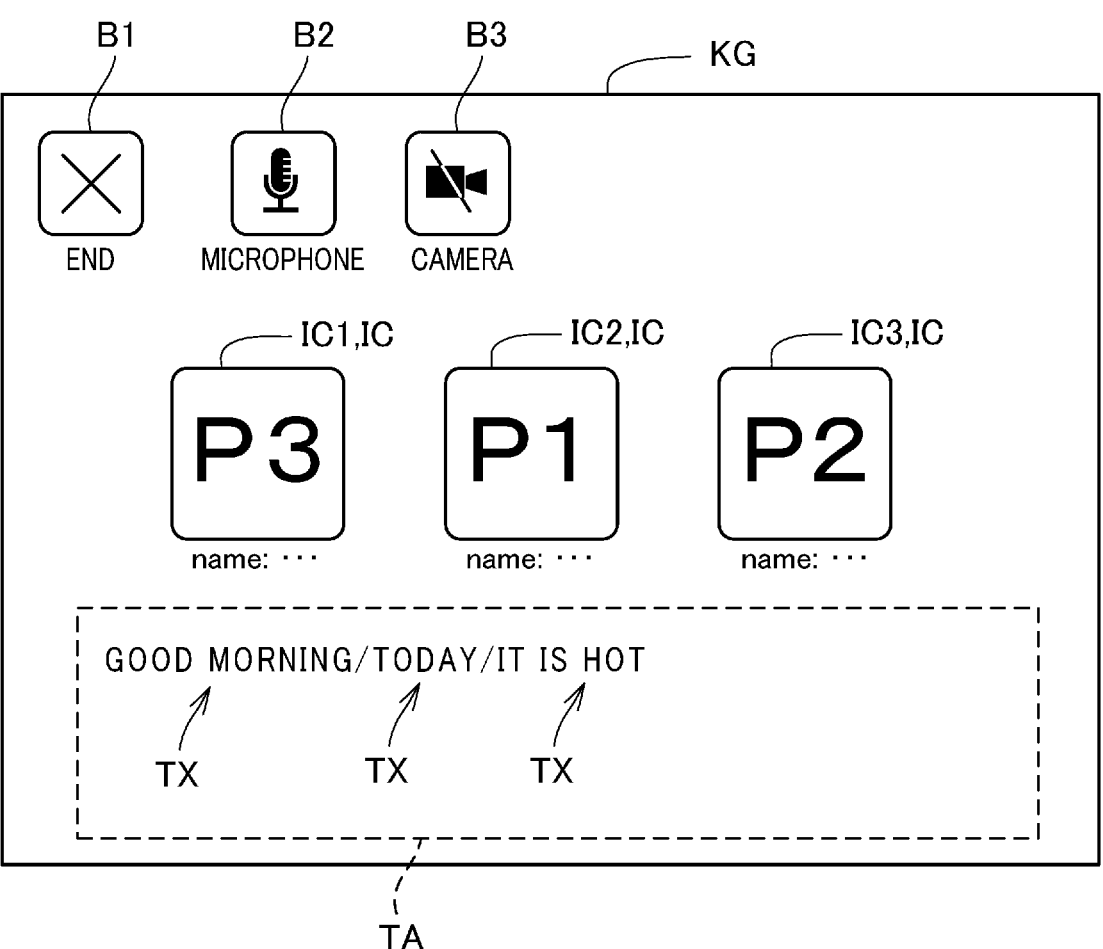
FIG. 4 is a diagram showing an example of a conference screen.

FIG. 4 is a diagram showing an example of the conference screen KG. The conference screen KG shown in FIG. 4 displays the text TX converted by the conversion unit 213.

The conference screen KG includes a text display area TA. The text display area TA is an area in which the text TX converted by the conversion unit 213 is displayed. The text display area TA shown in FIG. 4 displays text TX "Good morning", text TX "Today", and text TX "It is hot" in a line.

The display controller 217 displays the text TX converted by the conversion unit 213 in a first display mode or a second display mode depending on the speed of the vehicle 3 acquired by the state acquisition unit 212. Further, when execution of the driving support function of the vehicle 3 is turned on, the display controller 217 displays the text TX converted by the conversion unit 213 in the display mode accepted by the acceptance unit 215.

The first display mode and the second display mode will be described with reference to FIGS. 5 and 6.

Figure 5:
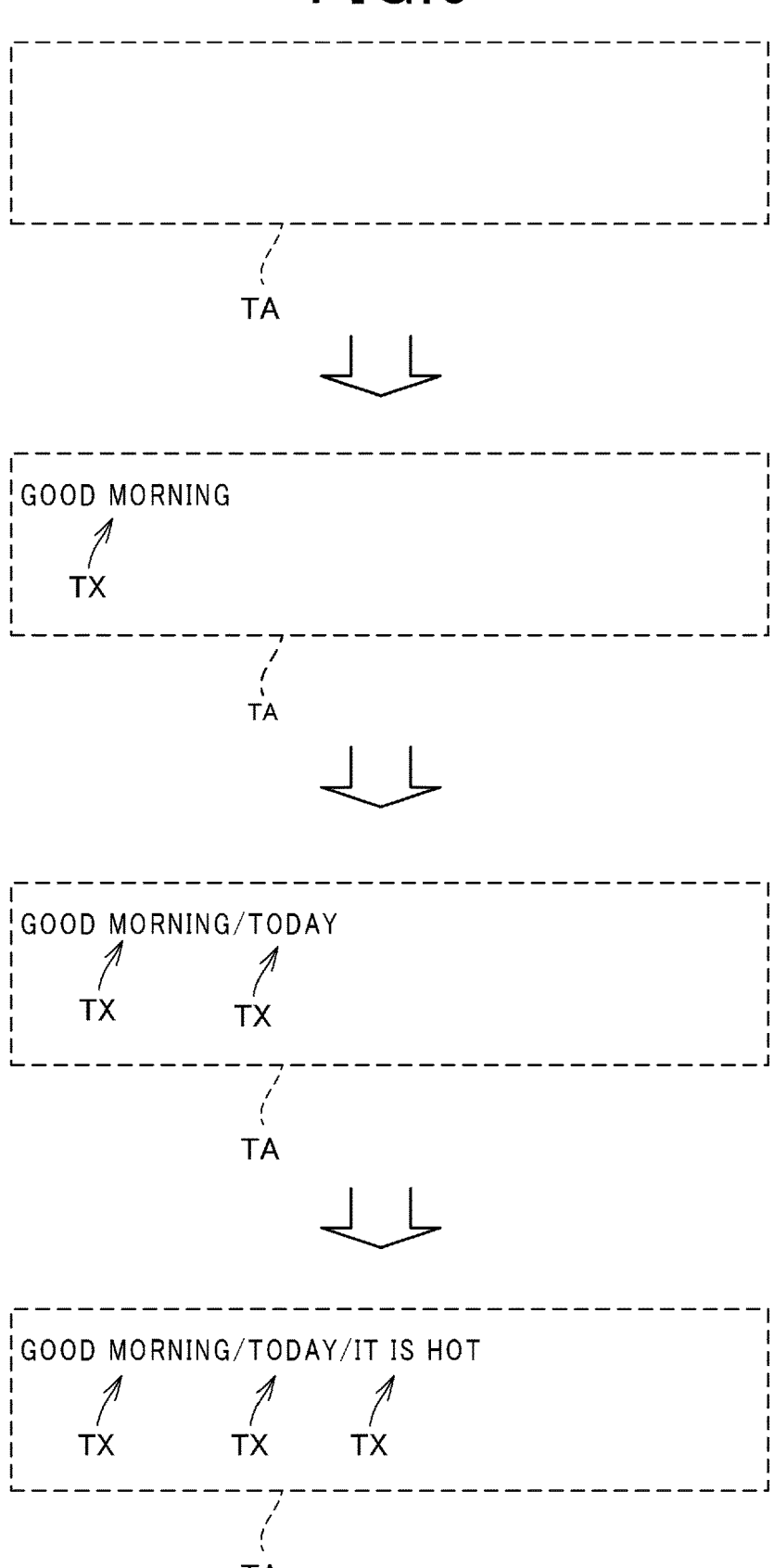
FIG. 5 is a diagram explaining a first display mode.
Figure 6:
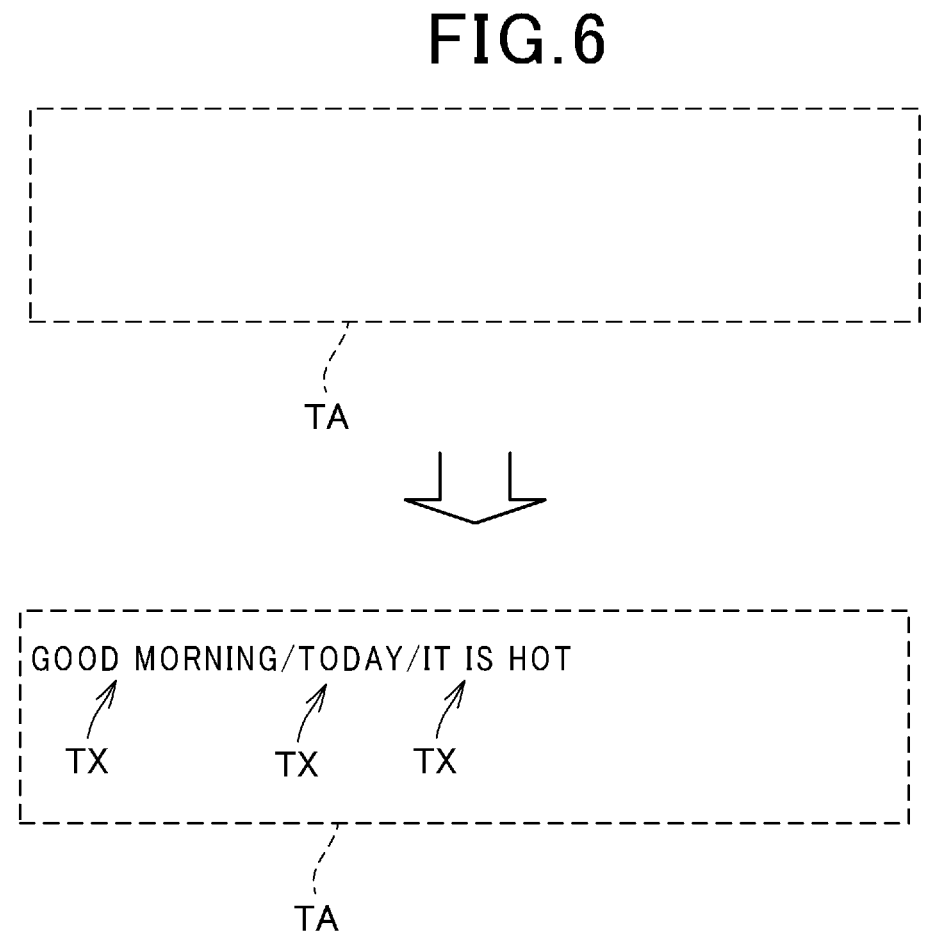

FIG. 5 is a diagram explaining the first display mode. FIG. 6 is a diagram explaining the second display mode.

The first display mode is a mode in which the text TX is displayed whenever the conversion unit 213 performs conversion. FIG. 5 shows a first display mode when any conference participant P speaks a voice "Good morning/ Today/It is hot". In this case of speaking, the conversion unit 213 of the present embodiment converts the voice "Good Morning", the voice "Today", and the voice "It is hot" into text TX in this order. For this reason, in this case of speaking, the display controller 217 first displays text TX "Good Morning", further displays text TX "Today" after such display, and further displays text TX "It is hot" after such display as shown in FIG. 5.

The second display mode is a mode in which the plurality of kinds of text TX converted by the conversion unit 213 are displayed collectively. For example, in the second display mode, a plurality of kinds of text TX converted by the conversion unit 213 from the start to the end of speaking of any conference participant P are displayed collectively. For example, in the second display mode, when the conversion unit 213 performs conversion for a predetermined number of times after displaying collectively the plurality of kinds of text TX before, the plurality of kinds of text TX converted by the conversion unit 213 for a predetermined number of times are displayed collectively. FIG. 6 shows a second display mode when any conference participant P speaks a voice "Good morning/Today/It is hot". In this case of speaking, the conversion unit 213 of the present embodiment converts the voice "Good Morning", the voice "Today", and the voice "It is hot" into text TX in this order. In this case of speaking, the display controller 217 displays collectively text TX "Good Morning", text TX "Today", and text TX "It's hot" at the same time as shown in FIG. 6.

3. Operation of Display Device

An operation of the display device 20 will be described below.

Figure 7:
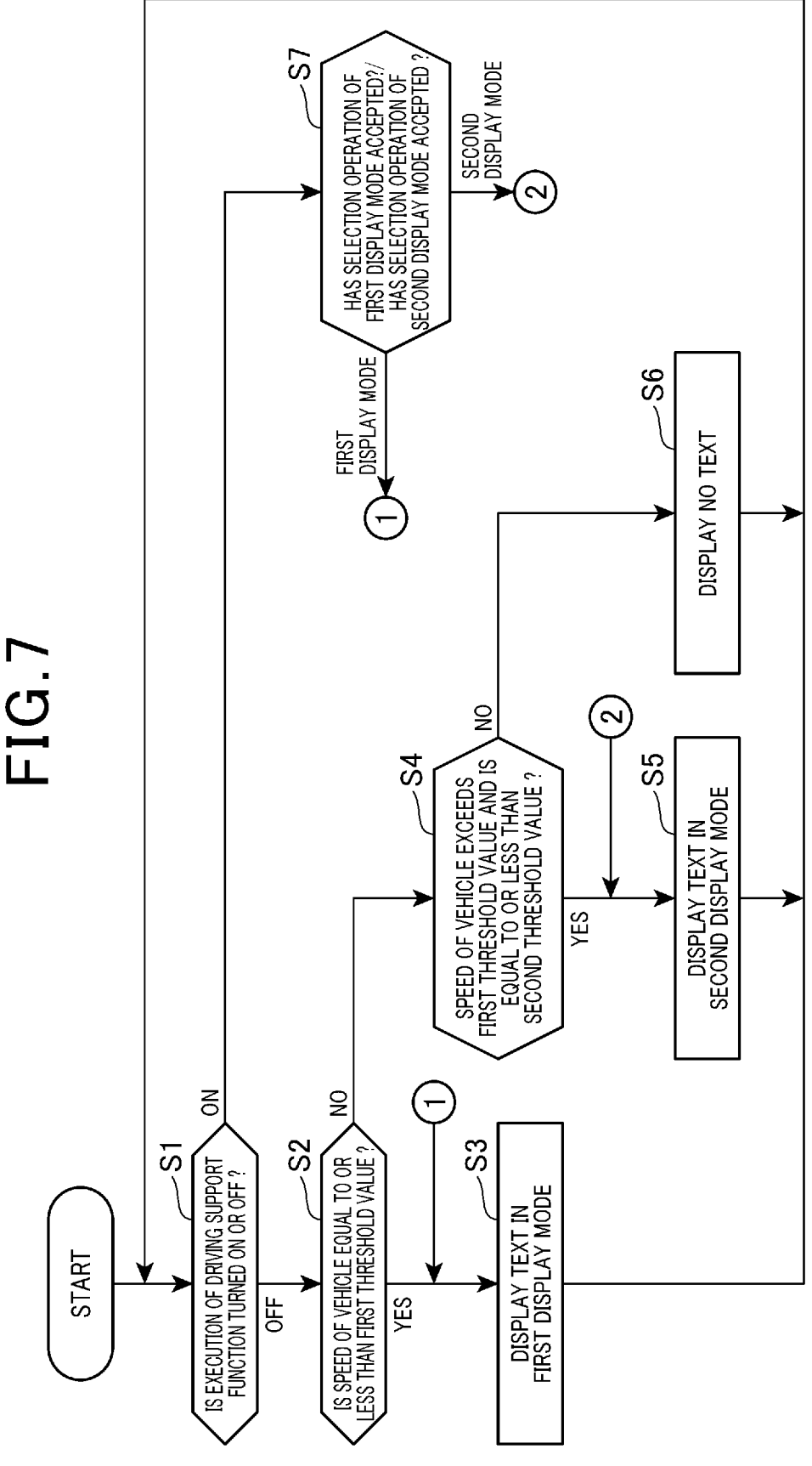
FIG. 7 is a flowchart showing an operation of a display device.

FIG. 7 is a flowchart showing an operation of the display device 20.

The determination unit 214 determines whether the execution of the driving support function of the vehicle 3 is turned on or off (step S1).

When the determination unit 214 determines whether the execution of the driving support function is turned off (step S1: off), the display controller 217 determines whether the speed of the vehicle 3 acquired by the state acquisition unit 212 is equal to or less than a first threshold value (step S2). The first threshold value is, for example, 5 km/h. The first threshold value is not limited to the value of this example.

When determining that the speed of the vehicle 3 acquired by the state acquisition unit 212 is equal to or less than the first threshold value (step S2: YES), the display controller 217 displays the text TX converted by the conversion unit 213 in the first display mode (step S3).

Next, when determining that the speed of the vehicle 3 acquired by the state acquisition unit 212 is not equal to or less than the first threshold value (step S2: NO), the display controller 217 determines whether the speed of the vehicle 3 acquired by the state acquisition unit 212 exceeds the first threshold value and is equal to or less than a second threshold value (step S4). The second threshold value is set, for example, between 6 km/h and 16 km/h. The second threshold value is not limited to the value within the range of this example.

When determining that the speed of the vehicle 3 acquired by the state acquisition unit 212 exceeds the first threshold value and is equal to or less than the second threshold value (step S4: YES), the display controller 217 displays the text TX converted by the conversion unit 213 in the second display mode (step S5).

When determining that the speed of the vehicle 3 acquired by the state acquisition unit 212 exceeds the first threshold value and is not equal to or less than the second threshold value, that is, exceeds the second threshold value (step S4: NO), the display controller 217 does not display the text TX converted by the conversion unit 213 (step S6).

Returning to the description of step S1, when the determination unit 224 determines that the execution of the driving support function is turned on (step S1: on), the display controller 217 determines the acceptance unit 215 accepts the selection operation for the first display mode or the selection operation for the second display mode (step S7).

When determining that the acceptance unit 215 accepts the selection operation for the first display mode (step S7: first display mode), the display controller 217 displays the text TX converted by the conversion unit 213 in the first display mode (step S3).

On the other hand, when determining that the acceptance unit 215 accepts the selection operation for the second display mode (step S7: second display mode), the display controller 217 displays the text TX converted by the conversion unit 213 in the second display mode (step S5).

4. Other Embodiments

The above-described embodiment is merely an example of one aspect of the present invention, and can be arbitrarily modified and applicable.

In the above-described embodiment, the touch panel 13 is exemplified as the "display unit", but the "display unit" may be a display not including a touch sensor. In the above-described embodiment, the display device 20 includes the "display unit", but the display device 20 may not include the "display unit".

In the above-described embodiments, the vehicle 3 includes the driving support device 19. In other embodiments, the vehicle 3 may include an autonomous driving device instead of or together with the driving support device 19. The autonomous driving device is a device for performing an autonomous driving function to automatically drive the vehicle 3. The autonomous driving device is connected to the display device 20, outputs information indicating that the execution of the autonomous driving function is turned on, to the display device 20, when the execution of the autonomous driving function is turned on, and outputs information indicating that the execution of the autonomous driving function is turned off, to the display device 20, when the execution of the autonomous driving function is turned off. In other embodiments, the determination unit 214 determines, based on the information output from the autonomous driving device, whether the execution of the autonomous driving function of the vehicle 3 is turned on or off. Then, in other embodiments, when the determination unit 214 determines that the execution of the autonomous driving function is turned on, the process proceeds to step S7 from step S1, and the processor 210 executes next processes including step S7, and when the determination unit 214 determines that the execution of the autonomous driving function is turned off, the process proceeds to step S2 from step S1, and the processor 210 executes next processes including step S2.

In other embodiments, the display mode may differ depending on whether the vehicle 3 is parking. The state acquisition unit 212 acquires from the shift position sensor 21 whether the vehicle 3 is in a parking state. Then, the display controller 217 displays the text TX in the first display mode when the state of the vehicle 3 acquired by the state acquisition unit 212 is parking, and displays the text TX in the second mode or does not display the text TX when the state of the vehicle 3 acquired by the state acquisition unit 212 is not parking.

In other embodiments, the communication control unit 211 may upload text information indicating the text TX converted while the display controller 217 does not display the text TX, to the conference server 1.

In the above-described embodiments, the "program" is exemplified as an application program, but the "program" may be configured as a part of the program of an OS (Operating System) of the display device 20.

In the above-described embodiments, the configuration is provided in which the voice spoken in Japanese is converted into text TX, but the language of the spoken voice to be converted by the conversion unit 213 is not limited to Japanese, and may be another language such as English.

In the above-described embodiment, the configuration is provided in which the conversion unit 213 converts the voice into the text TX for each clause, but the unit converted by the conversion unit 213 may be each character or each word.

The processor 210 may be configured by a single processor or may be configured by a plurality of processors. The processor 210 may be hardware programmed to realize the corresponding functional units. In other words, the processor 210 may be configured by, for example, an application specific integrated circuit (ASIC) or a field programmable gate array (FPGA).

Further, the configuration of the vehicle 3 shown in FIG. 2 is an example, and a specific implementation form is not particularly limited. In other words, hardware individually corresponding to each of the components may not necessarily be implemented, but it is apparently possible to realize functions of each of the components by executing programs by one processor. Further, a part of the functions realized by software in the aforementioned embodiments may be hardware, or a part of the functions realized by hardware may be realized by software. Additionally, a specific detail configuration of each of the components of the vehicle 3 can be arbitrarily changed.

The operation step units shown in FIG. 7 are divided depending on main process contents in order to facilitate understanding of the operation, and the present invention is not limited by a division method or a name of the process units. The operation step units may be divided into more step units depending on the process contents. In addition, one step unit may be divided so as to include more processes. The order of the steps may be changed as appropriate without departing from the spirit and scope of the present invention.

Further, in the case of realizing a control method of the display device 20 described above using the processor 210, it is also possible to implement the program to be executed by the processor 210 in the form of a recording medium or a transmission medium which transmits the program. In other words, the conference application 221 can be realized in the state of recording the conference application 221 in a portable information recording medium. Examples of the information recording medium are a magnetic recording medium such as a hard disk, an optical recording medium such as a CD and a semiconductor storage device such as a USB (Universal Serial Bus) memory and an SSD (Solid State Drive), and the other recording medium can be also used.

5. Configurations Supported by Embodiments Described Above

The above-described embodiments support the following configurations.

(Configuration 1) A display device to be provided in a vehicle, the display device including: a state acquisition unit configured to acquire a state of the vehicle; a conversion unit configured to convert a voice spoken in an online conference, in which an occupant of the vehicle participates, into text; and a display controller configured to display the text converted by the conversion unit on a display unit, wherein the display controller being configured to make display modes of the text converted by the conversion unit different from each other depending on the state of the vehicle acquired by the state acquisition unit.

According to the display device of Configuration 1, when the voice spoken in the online conference in which the occupant of the vehicle participates is displayed with the text, the display modes of text can be made different from each other in consideration of the state of the vehicle. Therefore, it is possible to display the text in consideration of the state of the vehicle when the voice spoken in the online conference in which the occupant of the vehicle participates is displayed with the text.

(Configuration 2) In the display device according to Configuration 1, the state acquisition unit acquires a speed of the vehicle as the state of the vehicle, and the display controller displays the text converted by the conversion unit whenever the conversion unit performs conversion when the speed of the vehicle acquired by the state acquisition unit is equal to or less than a first threshold value.

According to the display device of Configuration 2, when the speed of the vehicle is equal to or less than the first threshold value, the text is displayed every time the conversion unit performs conversion, and thus it is possible to prevent the real-time performance of the text display from deteriorating with respect to the voice spoken in the online conference. Therefore, it is possible to prevent a decrease in convenience in the online conference in which the occupant of the vehicle participates.

(Configuration 3) In the display device according to Configuration 2, the display controller displays collectively a plurality of kinds of text converted by the conversion unit when the speed of the vehicle acquired by the state acquisition unit exceeds the first threshold value and is equal to or less than a second threshold value.

According to the display device of Configuration 3, when the speed of the vehicle exceeds the first threshold value and is equal to or less than the second threshold value, a plurality of kinds of text converted by the conversion unit are displayed together, and thus it is possible to prevent the driver from being distracted by the display of the text. Therefore, during the online conference in which the occupant of the vehicle participates, it is possible to prevent the driver from being distracted by something other than driving, that is, from looking aside while driving.

(Configuration 4) In the display device according to Configuration 3, the conversion unit converts a voice into text for each clause.

According to the display device of Configuration 4, it is possible to understandably display the voice spoken in Japanese with the text.

(Configuration 5) In the display device according to Configuration 3 or 4, the display controller does not display the text converted by the conversion unit when the speed of the vehicle acquired by the state acquisition unit exceeds the second threshold value.

According to the display device of Configuration 5, when the speed of the vehicle exceeds the second threshold value, the text is not displayed, and thus the driver is not distracted by the display of the text when the speed of the vehicle exceeds the second threshold value. Therefore, it is possible to further prevent the driver from looking aside while driving during the online conference in which the occupant of the vehicle participates.

(Configuration 6) In the display device according to any one of Configurations 1 to 5, the display device further includes: a determination unit configured to determine whether execution of a driving support function of the vehicle or an autonomous driving function of the vehicle is turned on; wherein an acceptance unit configured to accept a selection operation for setting a display mode of the text displayed by the display controller to a first display mode or a second display mode when the determination unit determines that the execution of the driving support function of the vehicle is turned on or the execution of the autonomous driving function of the vehicle is turned on, the first display mode being a display mode in which the text converted by the conversion unit is displayed whenever the conversion unit performs conversion, and the second display mode being a display mode in which a plurality of kinds of text converted by the conversion unit are displayed collectively.

According to the display device of Configuration 6, when the execution of the driving support function or the autonomous driving function of the vehicle is turned on, the text can be displayed in a display mode selected by the occupant of the vehicle. Therefore, it is possible to improve the convenience in the online conference in which the occupant of the vehicle can participate.

(Configuration 7) A control method of a display device to be provided in a vehicle, the control method including: acquiring a state of the vehicle; converting a voice spoken in an online conference, in which an occupant of the vehicle participates, into text; and displaying the converted text on a display unit by making display modes of the converted text different from each other depending on the acquired state of the vehicle.

According to the control method of a display device of Configuration 7, the same effect as in the display device of Configuration 1 is achieved.

(Configuration 8) A non-transitory computer readable recording medium recording a program causing a processor of a display device to be provided in a vehicle to function as: a state acquisition unit configured to acquire a state of the vehicle; a conversion unit configured to convert a voice spoken in an online conference, in which an occupant of the vehicle participates, into text; and a display controller configured to display the text converted by the conversion unit on a display unit, wherein the display controller being configured to make display modes of the text converted by the conversion unit different from each other depending on the state of the vehicle acquired by the state acquisition unit.

According to the recording medium of Configuration 8, the same effect as in the display device of Configuration 1 is achieved.

REFERENCE SIGNS LIST 1 conference server
2, 2-1, 2-2 terminal device
3 vehicle
13 touch panel (display unit)
19 driving support device
21 shift position sensor
22 vehicle speed sensor
210 processor
211 communication control unit
212 state acquisition unit
213 conversion unit
214 determination unit
215 acceptance unit
216 voice output unit
217 display controller
220 memory
221 conference application (program)
230 operation switch group
240 interface unit
P occupant

What is claimed is:

1. A display device to be provided in a vehicle, the display device comprising a processor that is configured to:
   acquire a speed of the vehicle;
   convert a voice spoken in an online conference, in which an occupant of the vehicle participates, into text; and
   display the text converted on a display,
   wherein the processor is further configured to:
   display the text converted whenever conversion is performed when the speed of the vehicle acquired is equal to or less than a first threshold value; and
   display collectively a plurality of kinds of text converted by the conversion unit when the speed of the vehicle acquired exceeds the first threshold value and is equal to or less than a second threshold value.

2. The display device according to claim 1, wherein the processor is configured to convert a voice into text for each clause.

3. The display device according to claim 1, wherein the processor is configured to not display the text converted when the speed of the vehicle acquired exceeds the second threshold value.

4. The display device according to claim 1, wherein the processor is further configured to:

determine whether execution of a driving support function of the vehicle or an autonomous driving function of the vehicle is turned on; and accept a selection operation for setting a display mode of the text displayed to a first display mode or a second display mode when determining that the execution of the driving support function of the vehicle is turned on or the execution of the autonomous driving function of the vehicle is turned on, the first display mode being a display mode in which the text converted is displayed whenever conversion is performed, and the second display mode being a display mode in which a plurality of kinds of text converted are displayed collectively.

5. A control method of a display device to be provided in a vehicle, the control method comprising:

acquiring a speed of the vehicle;

converting a voice spoken in an online conference, in which an occupant of the vehicle participates, into text; and displaying the converted text on a display, where, when displaying, the control method includes:

displaying the text converted whenever conversion is performed when the speed of the vehicle acquired is equal to or less than a first threshold value; and displaying collectively a plurality of kinds of text converted when the speed of the vehicle acquired exceeds the first threshold value and is equal to or less than a second threshold value.

6. A non-transitory computer readable recording medium recording a program causing a processor of a display device to be provided in a vehicle to function as:

a state acquisition unit configured to acquire a speed of the vehicle;

a conversion unit configured to convert a voice spoken in an online conference, in which an occupant of the vehicle participates, into text; and a display controller configured to display the text converted by the conversion unit on a display, wherein the display controller displays the text converted by the conversion unit whenever the conversion unit performs conversion when the speed of the vehicle acquired by the state acquisition unit is equal to or less than a first threshold value, and the display controller displays collectively a plurality of kinds of text converted by the conversion unit when the speed of the vehicle acquired by the state acquisition unit exceeds the first threshold value and is equal to or less than a second threshold value.

* * * * *